(12) United States Patent
Kim et al.

(10) Patent No.: US 9,074,456 B2
(45) Date of Patent: Jul. 7, 2015

(54) SYSTEM AND METHOD OF CONTROLLING FLUID TEMPERATURE FOR IMPROVING INJECTIVITY OF SUPERCRITICAL CARBON DIOXIDE INTO STRATUM

(75) Inventors: Kue-Young Kim, Daejeon (KR); Taehee Kim, Daejeon (KR); Jeong-Chan Kim, Daejeon (KR)

(73) Assignee: KOREA INSTITUTE OF GEOSCIENCE AND MINERAL RESOURCES, Daejon (KR)

( * ) Notice: Subject to any disclaimer, the term of this patent is extended or adjusted under 35 U.S.C. 154(b) by 794 days.

(21) Appl. No.: 13/289,803

(22) Filed: Nov. 4, 2011

(65) Prior Publication Data
US 2012/0132425 A1    May 31, 2012

(30) Foreign Application Priority Data
Nov. 29, 2010 (KR) ........................ 10-2010-0119847

(51) Int. Cl.
E21B 36/04 (2006.01)
E21B 36/00 (2006.01)
E21B 41/00 (2006.01)

(52) U.S. Cl.
CPC ............. *E21B 41/0064* (2013.01); *E21B 36/04* (2013.01); *Y02C 10/14* (2013.01)

(58) Field of Classification Search
CPC ..... E21B 43/24; E21B 36/00; E21B 43/2401; E21B 43/16; E21B 36/04; E21B 43/164; E21B 36/005; E21B 43/166; E21B 41/0064; C09K 8/58

USPC .................. 166/302, 57, 61, 60, 272, 1, 402; 392/301, 305, 306; 219/415–419
See application file for complete search history.

(56) References Cited

U.S. PATENT DOCUMENTS

| 4,457,365 A * | 7/1984 | Kasevich et al. ............... 166/60 |
| 7,726,402 B2 * | 6/2010 | Ramakrishnan et al. .. 166/305.1 |
| 2010/0212893 A1 * | 8/2010 | Moini Araghi et al. .... 166/272.1 |
| 2010/0243248 A1 * | 9/2010 | Golomb et al. ............... 166/270 |

\* cited by examiner

*Primary Examiner* — Shane Bomar
*Assistant Examiner* — Wei Wang
(74) *Attorney, Agent, or Firm* — Christie, Parker & Hale, LLP

(57) ABSTRACT

A system and a method of controlling a fluid temperature for improving injectivity of a supercritical carbon dioxide into a stratum includes a casing part installed in a well, which is formed from a ground surface to a target stratum for injection, a grouting part formed between the casing part and a counterforted wall of the well, a cover covering an upper portion of the casing part, an injection tube inserted into the casing part through the cover and receiving the carbon dioxide injected into the injection tube, a perforation part serving as a passage allowing the carbon dioxide to flow from the injection tube to the target stratum, a packing part formed between the injection tube and an inner portion of the casing part, a heat coil part surrounding the injection tube, and a temperature adjusting unit controlling a temperature of the heat coil part.

9 Claims, 10 Drawing Sheets

SYSTEM AND METHOD OF CONTROLLING FLUID TEMPERATURE FOR IMPROVING INJECTIVITY OF SUPERCRITICAL CARBON DIOXIDE INTO STRATUM

CROSS-REFERENCE TO RELATED APPLICATION

This application claims the benefit under 35 U.S.A. §119 of Korean Patent Application No. 10-2010-0119847, filed on Nov. 29, 2010 in the Korean Intellectual Property Office, the entirety of which is incorporated herein by reference.

BACKGROUND OF THE INVENTION

1. Field of the Invention

The present invention relates to a system and a method of controlling a fluid temperature for improving the injectivity of supercritical carbon dioxide into a stratum.

2. Description of the Related Art

A geological storage technology of carbon dioxide ($CO_2$) is to geologically inject the $CO_2$, which is exhausted into the atmosphere, to isolate the $CO_2$ from the atmosphere. The geological storage technology has been already proven and is in the commercialization step in some nations. In general, if the storage place of the $CO_2$ is selected, an injection well system is installed to geologically store the $CO_2$. First, if a bore is formed to a target depth (about 800 m) for injection under the ground, in which $CO_2$ can exist in the supercritical state, by using a boring machine and an injection well is formed, a casing is installed in the injection well, and cement is grouted throughout the whole peripheral space between the casing and a counterforted wall, thereby preventing the leakage path of the injected $CO_2$ to the ground surface. Thereafter, several small holes are formed by perforating the casing and the cement corresponding to a target section for $CO_2$ injection by using a perforating gun, thereby forming a connection passage between the injection well and the peripheral stratum. The supercritical $CO_2$ injected through the injection well is injected into the stratum through the connection passage, so that the geological storage of the $CO_2$ is achieved. In the geological storage of the $CO_2$, the injectivity, the storage capacity, and the integrity in which the injected $CO_2$ does not leak to the ground surface must be mainly taken into consideration.

If the $CO_2$ injection system is completed, the temperature and the pressure suitable for the geological storage of the $CO_2$ are determined at the upper portion of the injection well, and the $CO_2$ is injected. However, the temperature and the pressure of the $CO_2$ when the $CO_2$ is injected may be changed according to the geothermal gradient and the hydrostatic pressure gradient as the $CO_2$ is transferred down to the storage depth of the injection well through a stratum.

In general, the pressure at the injection depth is determined by following equation.

$$P_{IP} = P_{WH} + g\int_0^z \rho(z)dz \quad \text{Equation}$$

In the equation, $P_{IP}$ refers to a pressure at the injection depth of the lower portion of the injection well, $P_{WH}$ refers to a pressure at the upper portion of the injection well, g refers to gravitational acceleration, and $\rho(z)$ refers to the density of the $CO_2$ at the injection depth z of the injection well.

In other words, the density of the $CO_2$ varies according to the temperature and pressure under the ground, so that the variation in the density of the $CO_2$ affects an injection pressure at the injection depth. The $CO_2$ density in the storage place affects the mobility of the $CO_2$, so that an influence is exerted on the two-phase flow of the $CO_2$ in the air gaps filled with salt water.

If the supercritical $CO_2$ is injected by using a conventional injection well system, the temperature and the pressure of the $CO_2$ may be adjusted at the upper portion of the injection well. However, the temperature and the pressure of the injected $CO_2$ varying as the $CO_2$ passes through the stratum cannot be adjusted, so that the $CO_2$ cannot be effectively injected.

In general, the injectivity of the $CO_2$ is determined by following equation.

$$\text{Injectivity} = \frac{Q}{P_{bhp} - P_{res}} \quad \text{Equation}$$

In this equation, Q refers to an amount of injected $CO_2$, $P_{bhp}$ refers to a pressure at the injection depth of the lower portion of the injection well, and $P_{res}$ refers to a pressure at the target stratum for $CO_2$ injection. In other words, this equation refers to that the injectivity is increased if the pressure is reduced at the injection depth of the lower portion of the injection well on the assumption that the amount of the injected $CO_2$ is constant If the injectivity is reduced, many injection wells are required, so that economic loss may be caused. In addition, if the pressure in the target stratum for the storage of the $CO_2$ is increased, the stress is changed in the stratum around the injection well, so that the stratum can be finely cracked. Accordingly, the injected $CO_2$ may be leaked to the ground surface through the crack. In other words, the excess pressure increase caused by the injection of the $CO_2$ exerts bad influences on both the injectivity and the leakage of the $CO_2$. Accordingly, a scheme to prevent the increase of the pressure in the target stratum for the $CO_2$ injection is required In general, the geological storage of the $CO_2$ is achieved by injecting the $CO_2$ into a sand stone layer saturated with salt water that cannot be used as drinking water. If the supercritical $CO_2$ is injected into a stratum saturated with salt water, the supercritical $CO_2$ dispels the salt water so that the supercritical $CO_2$ is stored in the air gap. In this case, a small amount of salt water remains in the air gaps by a residual saturation value. The water of the remaining salt water is evaporated by the supercritical $CO_2$, so that the air gaps are fully saturated with the supercritical $CO_2$, thereby forming a dry-out zone. If water of remaining salt water in the air gaps of the dry-out zone is evaporated by the supercritical $CO_2$, salt is deposited. The deposited slat is filled in the air gaps, so that the porosity and the transmissivity are reduced. Accordingly, the pressure is increased, so that the injectivity may be reduced.

SUMMARY OF THE INVENTION

Accordingly, the present invention has been made keeping in mind the above problems occurring in the prior art, and an object of the present invention is to provide a system and a method of controlling the fluid temperature for improving the injectivity of supercritical $CO_2$ into a stratum, in which an injection tube of the $CO_2$ is surrounded by a heat coil, the temperature of the heat coil is controlled by a temperature adjusting system installed on the ground, and the injection temperature of the $CO_2$ is controlled to maximize the injectivity, by installing a temperature sensor and a pressure sensor capable of recording the temperature and the pressure of the $CO_2$, respectively, when the $CO_2$ is geologically injected, so that the geological system of the $CO_2$ can be economically improved.

The present invention suggests several objects without limitation to the above objects, and other objects, which are not described, can be clearly comprehended from the following description by those skilled in the art.

To accomplish these objects, according to one aspect of the present invention, there is provided a system of controlling a fluid temperature for improving injectivity of a supercritical carbon dioxide into a stratum, which includes a casing part installed in a well, which is formed from a ground surface to a target stratum for injection, in order to inject the supercritical carbon dioxide into the target stratum for injection which is placed under a ground, a grouting part formed between the casing part and a counterforted wall of the well, a cover covering an upper portion of the casing part, an injection tube inserted into the casing part through the cover and receiving the carbon dioxide injected into the injection tube, a perforation part serving as a passage allowing the carbon dioxide to flow from the injection tube to the target stratum, a packing part formed between the injection tube and an inner portion of the casing part, a heat coil part surrounding the injection tube, and a temperature adjusting unit controlling a temperature of the heat coil part.

According to one embodiment of the present invention, the system of controlling the fluid temperature for improving injectivity of the supercritical carbon dioxide into the stratum may further include a temperature sensor installed in the injection tube, and a temperature recording unit storing temperature measurement information obtained from the temperature sensor. The temperature adjusting unit may control the temperature of the heat coil part by using the temperature measurement information stored in the temperature recording unit.

According to one embodiment of the present invention, the system of controlling the fluid temperature for improving injectivity of the supercritical carbon dioxide into the stratum may further include a pressure sensor installed in the injection tube, a pressure recording unit storing pressure measurement information obtained from the pressure sensor, and a temperature control system calculating a temperature value representing optimal injectivity by using the temperature measurement information obtained from the temperature recording unit and the pressure measurement information obtained from the pressure recording unit and transmitting the temperature value to the temperature adjusting unit, so that the heat coil part emits heat corresponding to the temperature value.

The temperature sensor may measure a temperature of the carbon dioxide injected into the target stratum through the injection tube, and the pressure sensor measures a pressure of the carbon dioxide injected into the target stratum through the injection tube.

The heat coil part may include a thermal conductive material, and may surround the injection tube from an upper end portion of the injection tube to a lower end portion of the injection tube.

The heat coil part may adjust a temperature of the carbon dioxide by emitting heat corresponding to a temperature value received from the temperature adjusting unit when the carbon dioxide passes through the injection tube.

The perforation part may include a plurality of holes bored in the casing part and the grouting part placed in the target stratum for injection.

According to another aspect of the present invention, there is provided a method of controlling a fluid temperature for improving injectivity of a supercritical carbon dioxide into a stratum, which includes measuring a temperature of the supercritical carbon dioxide passing through an injection tube in a temperature sensor which is installed in the injection tube into which the supercritical carbon dioxide is injected, storing temperature measurement information, which is obtained from the temperature sensor, in a temperature recording unit, and controlling a temperature of a heat coil part surrounding the injection tube by using the temperature measurement information, which is stored in the temperature recording unit, in a temperature adjusting unit.

According to one embodiment of the present invention, the method of controlling a fluid temperature for improving injectivity of the supercritical carbon dioxide into the stratum, may further include measuring a pressure of the carbon dioxide passing through the injection tube in a pressure sensor installed in the injection tube, storing pressure measurement information obtained from the pressure sensor in a pressure recording unit, calculating a temperature value representing optimal injectivity by using the temperature measurement information of the temperature recording unit and the pressure measurement information of the pressure recording unit in a temperature control system, and transmitting the temperature value to the temperature adjusting unit in the temperature control system, so that the heat coil part emits heat corresponding to the temperature value.

The heat coil part may include a thermal conductive material, and may surround the injection tube from an upper end portion of the injection tube to a lower end portion of the injection tube.

The heat coil part may adjust the temperature of the carbon dioxide by emitting heat corresponding to a temperature value received from the temperature adjusting unit when the carbon dioxide passes through the injection tube.

The perforation part may include a plurality of holes bored in the casing part and the grouting part placed in the target stratum for injection.

Advantages and/or characteristics of the present invention, and methods to accomplish them will be apparently comprehended by those skilled in the art when making reference to embodiments in the following description and accompanying drawings. However, the present invention is not limited to the following disclosed embodiments, but will be realized as various modifications. The present embodiments are provided to make the disclosure of the present invention perfect and to make those skilled in the art perfectly comprehend the scope of the present invention. The present invention is defined only within the scope of claims. Hereinafter, the same reference numerals will be assigned to the same elements throughout the whole specification.

As described above, according to the embodiment of the present invention, the injection tube of the $CO_2$ is surrounded by the heat coil, and the temperature of the $CO_2$ is controlled by the temperature adjusting system installed on the ground when the $CO_2$ is geologically injected at the depth of 800 m under the ground, thereby adjusting the density of the $CO_2$ in the injection well. Accordingly, the injection pressure of the fluid at an injection point of the injection well can be adjusted.

According to one embodiment of the present invention, the density of the $CO_2$ varying through the temperature control changes the mobility of the fluid under the ground, thereby controlling the injectivity of the $CO_2$.

DETAILED DESCRIPTION OF THE INVENTION

Hereinafter, exemplary embodiments of the present invention will be described in detail with reference to accompanying drawings.

Figure 1:
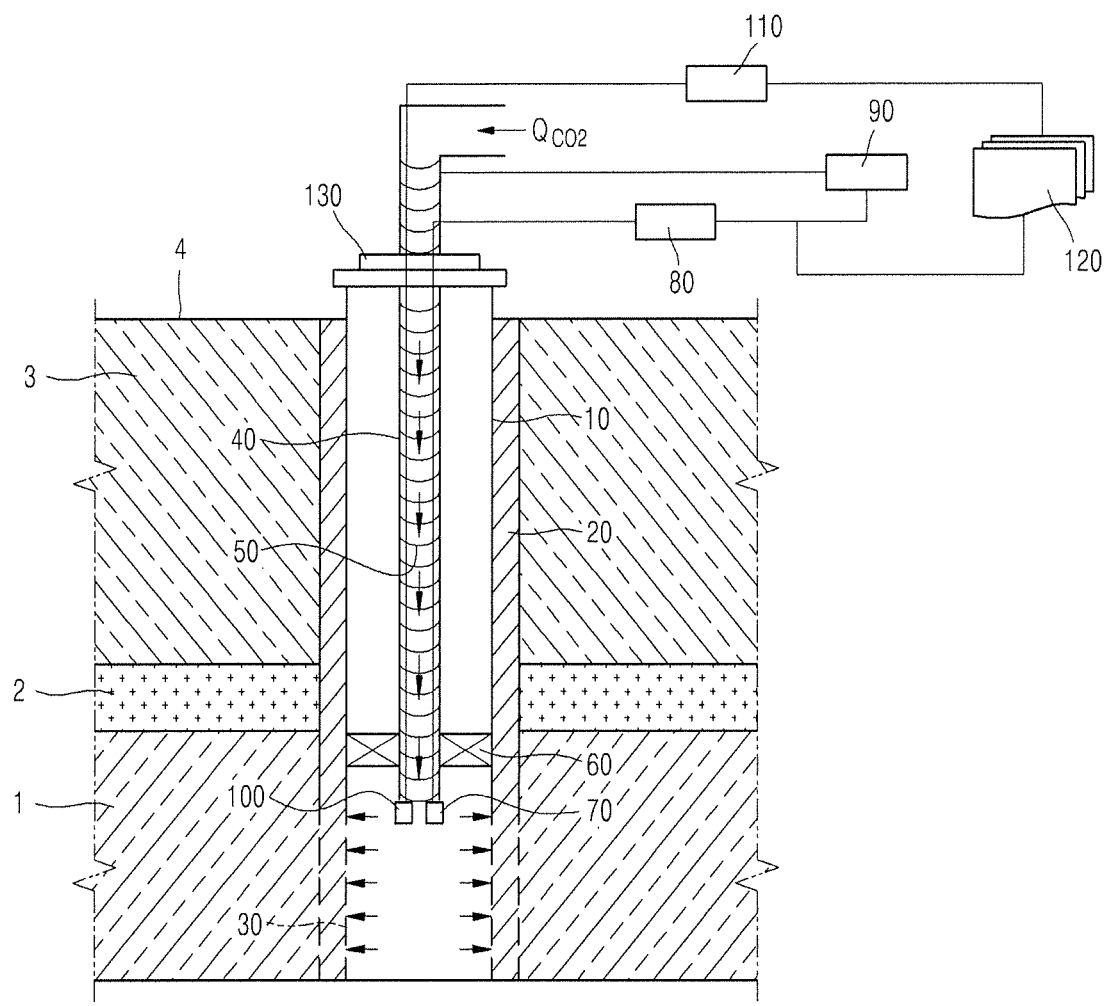
FIG. 1 is a sectional view showing the overall structure of a system of controlling a fluid temperature for improving the injectivity of supercritical $CO_2$ into a stratum according to one embodiment of the present invention.

FIG. 1 is a sectional view showing the structure of a system of controlling a fluid temperature for improving injectivity of supercritical carbon dioxide ($CO_2$) into a stratum according to one embodiment of the present invention.

Referring to FIG. 1, the system of controlling a fluid temperature for improving the injectivity of supercritical $CO_2$ into the stratum according to one embodiment of the present invention includes a casing part 10, a grouting part 20, a perforation part 30, a cover 130, an injection tube 40, a packing part 60, a heat coil part 50, a temperature adjusting unit 90, a temperature sensor 70, a temperature recording unit 80, a pressure sensor 100, a pressure recording unit 110, and a temperature control system 120.

The casing part 10 is inserted into an injection well formed from a ground surface 4 to a target stratum 1 in order to inject supercritical $CO_2$ into the target stratum 1 under the ground. In other words, the casing part 10 is installed from the ground surface 4 to the target stratum 1 through the injection well.

In this case, the target stratum 1 includes a sand stone layer having superior storage capacity of $CO_2$ and has air gaps filled with salt water that a human cannot drink. In addition, in the target stratum 1, supercritical $CO_2$ is stored in the gas state, or dissolved in the salt water existing in the air gaps.

The grouting part 20 is formed between the casing part 10 and the counter forted wall of the injection well. The grouting part 20 is formed by passing through the ground surface 4 to the target stratum 1. The grouting part 20 may be formed through a grouting scheme with a concrete material.

The perforation part 30 serves as a passage allowing the supercritical $CO_2$ to flow from the injection tube 40 to the target stratum 1. The perforation part 30 may be formed as a transmission hole which is artificially bored in small size through the casing part 10 and the grouting part 20, so that the supercritical $CO_2$ can flow from the injection tube 40 to the target stratum 1.

For example, in order to form the perforation part 30, small holes may be formed by perforating the casing part 10 and the grouting part 20 positioned corresponding to the section of the target stratum 1 using a perforating gun. The perforation part 30 formed in the above manner can move the supercritical $CO_2$ to the target stratum 1.

The cover 130 covers the upper portion of the casing part 10 to prevent foreign matters from being introduced into the casing part 10 and injection tube 40.

The injection tube 40 passes through the cover 130. In detail, the injection tube 40 extends to the injection depth through a hole formed in the central portion of the cover 130 covering the upper portion of the casing part 10. The injection tube 40 is connected to a supercritical $CO_2$ injector at an upper end thereof, so that the supercritical $CO_2$ can be injected into the target stratum 1.

The packing part 60 is formed between the injection tube 40 and the inner part of the casing part 10. The packing part 60 prevents the supercritical $CO_2$, which is injected into the injection tube 40, from flowing back to the upper portion of the casing part 10 so that the supercritical $CO_2$ can be injected to the target stratum 1.

The heat coil part 50 surrounds the injection tube 40. In other words, the heat coil part 50 includes a material representing high thermal conductivity and surrounds the injection tube 40 from an upper end of the injection tube 40 to the lower most portion of the inject tube 40.

When the supercritical $CO_2$ passes through the inner portion of the injection tube 40, the heat coil part 50 emits heat corresponding to a temperature value received therein from the temperature adjusting unit 90 positioned on the ground to adjust the temperature of the supercritical $CO_2$.

The temperature adjusting unit 90 adjusts the temperature of the heat coil part 50.

According to one embodiment of the present invention, when the supercritical $CO_2$ moves to the injection depth of the injection well through the injection tub 40, the supercritical $CO_2$ can be maintained at a desirable temperature by the heat coil part 50 surrounding the injection tube 40 and the temperature adjusting unit 90.

The temperature sensor 70 is installed at an inner end portion of the injection tube 40. The temperature sensor 70 measures the temperature of the $CO_2$ at the $CO_2$ injection point in a deep place. The temperature sensor 70 transmits the measured temperature result (information) to the temperature recording unit 80, so that temperature data of the $CO_2$ can be monitored in real time.

The temperature recording unit 80 stores the measured temperature information obtained from the temperature sensor 70.

The pressure sensor 100 is installed in the injection tube 40. The pressure sensor 100 measures the pressure at the $CO_2$ injection point in the deep place. The pressure sensor 100 transmits the measured pressure result (information) to the pressure recording unit 110, so that pressure data of the $CO_2$ can be monitored in real time.

The pressure recording unit 110 stores the measured pressure information obtained from the pressure sensor 100.

The temperature control system 120 automatically adjusts the temperature of the $CO_2$ in cooperation with the temperature recording unit 80 and the pressure recording unit 110, so that the injectivity of the $CO_2$ can be optimized. In other words, the temperature control system 120 analyzes the temperature data and the pressure data of the $CO_2$ at the $CO_2$ injection point in the deep place, calculates an injection temperature value allowing the whole $CO_2$ injection system to represent the optimal injectivity while maintaining the maximum injection amount of the CO2 at the minimum injection pressure of the $CO_2$, and gives a command based on the temperature value to the temperature adjusting unit 90 to adjust the temperature of the heat coil part 50.

In other words, the temperature control system 120 continuously performs a feedback operation based on values (temperature data and pressure data) read out of the temperature sensor 70 and the pressure sensor 100 to obtain the maximum injectivity.

For reference, reference numbers 2 and 3, which are not described yet, represent a blocking stratum and a ground surface layer, respectively.

Figure 2:
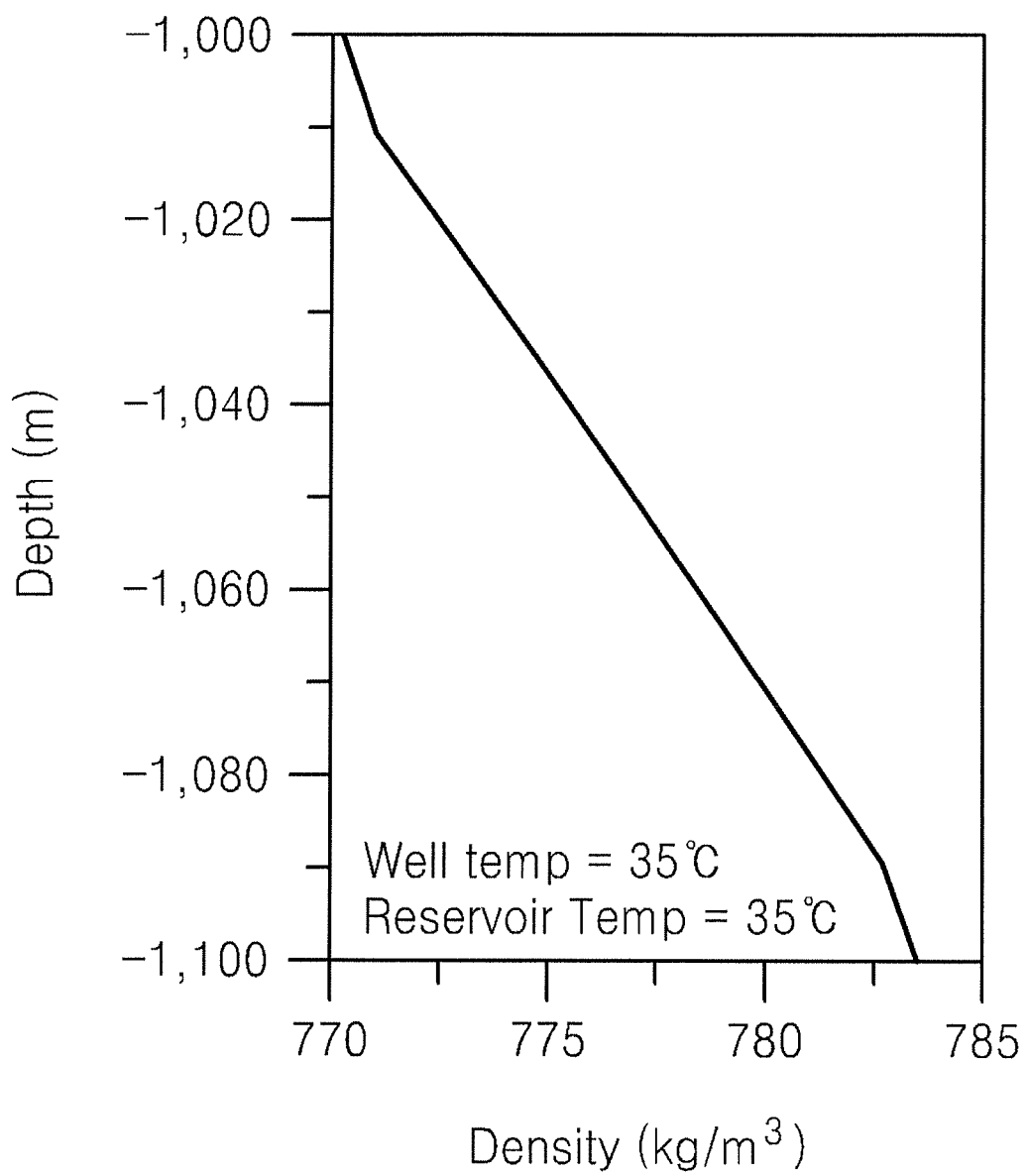
FIGS. 2 to 4 are graphs showing the variation of the $CO_2$ density in the injection well according to injection temperatures when the supercritical $CO_2$ is injected according to one embodiment of the present invention.
Figure 10:
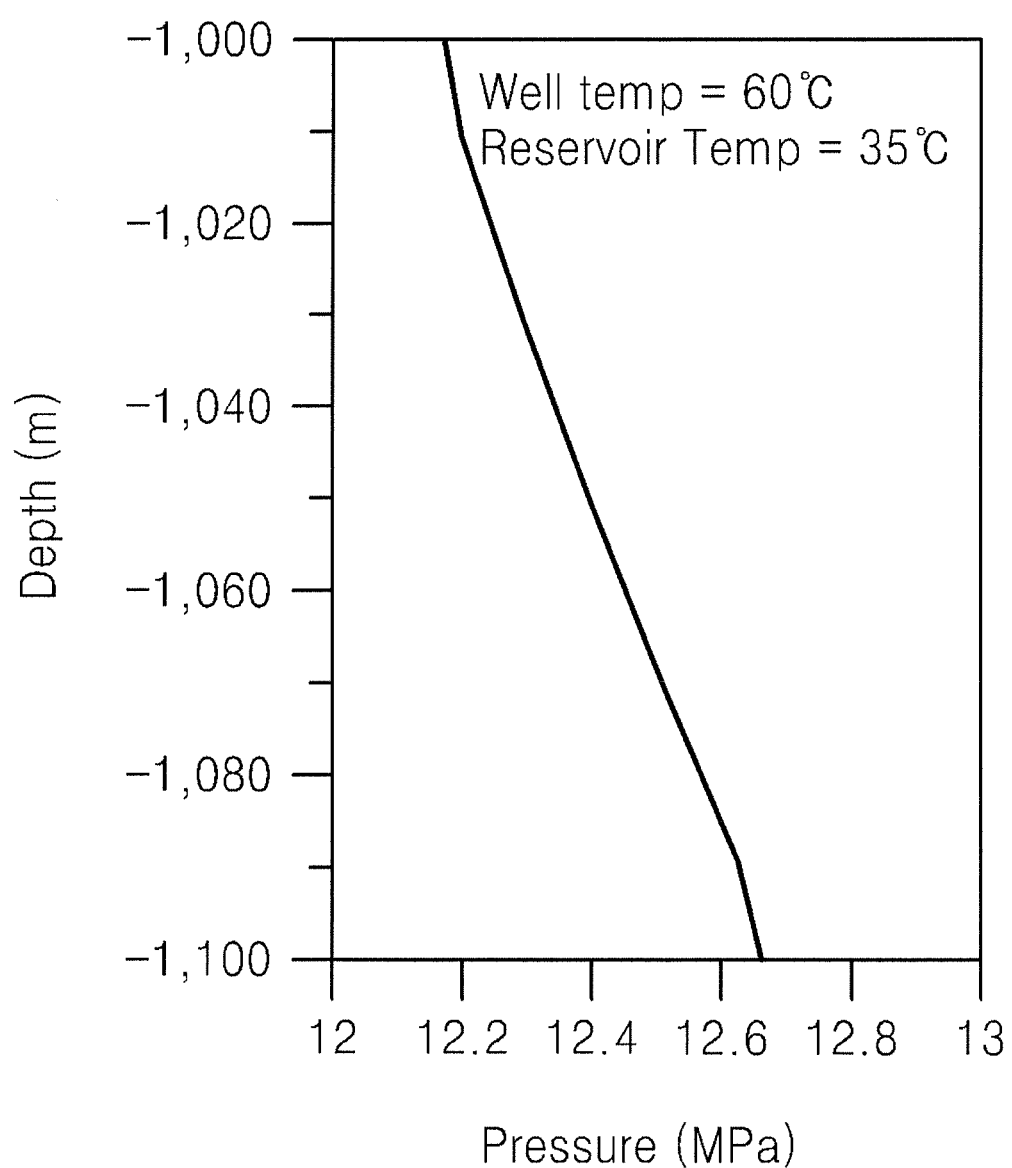

FIGS. 2 and 10 are graphs showing experimental results obtained by performing numerical experiments through multi-phase and multi-component fluid flow simulators in the system of controlling a fluid temperature according to one embodiment of the present invention in order to observe the influence which is exerted on the density of the fluid, a dry-out range, and the injection pressure of the injection section by the temperature variation of the $CO_2$ in the injection well. The present experiment is performed on the assumption that the supercritical $CO_2$ is injected into a homogeneous sand stone layer, which is placed at the depth of 1000 m under the ground and saturated with salt water, and has the thickness of about 100 m, at the injection rate of about 30 kg/sec for three years.

Figure 3:
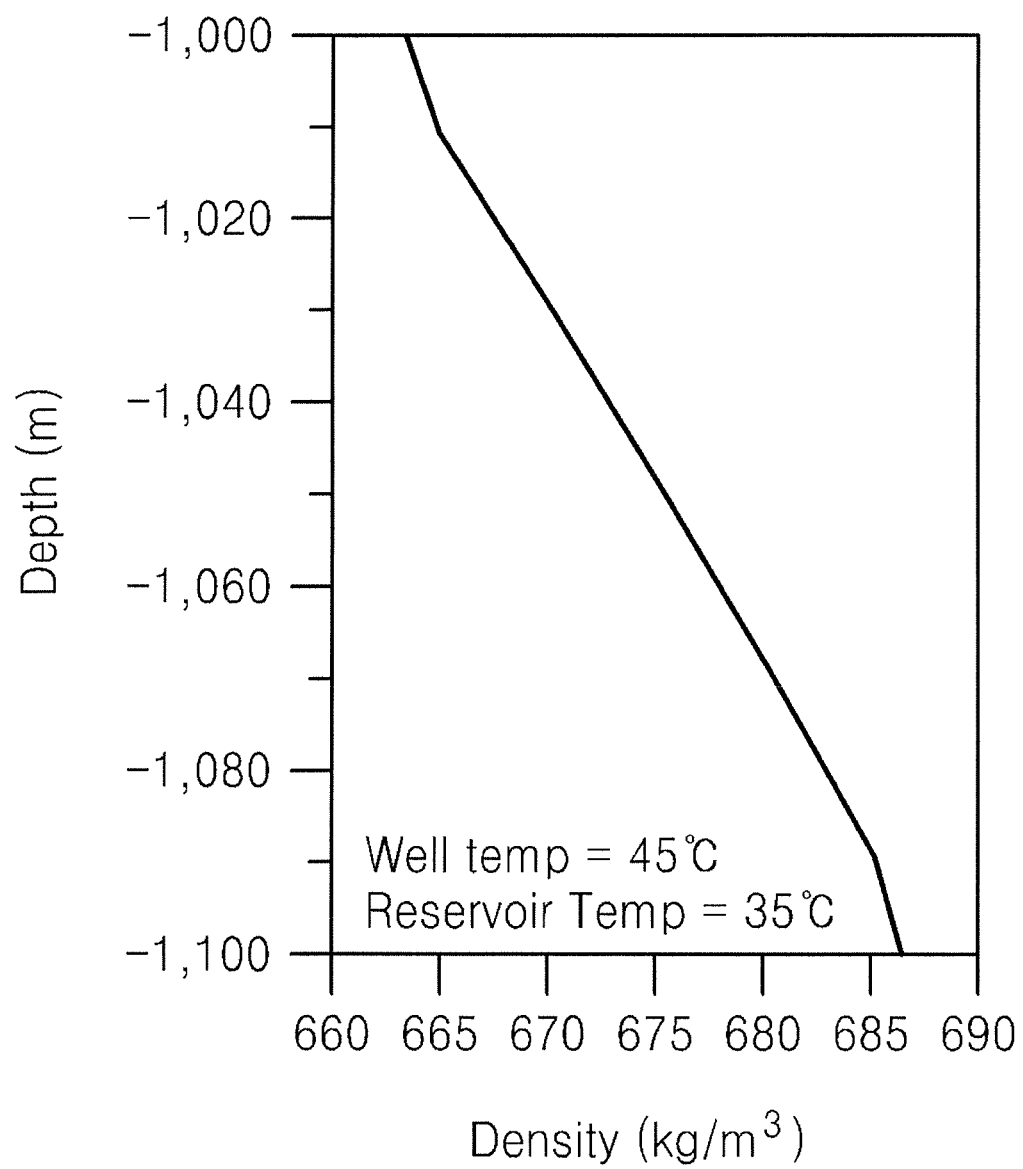
Figure 4:
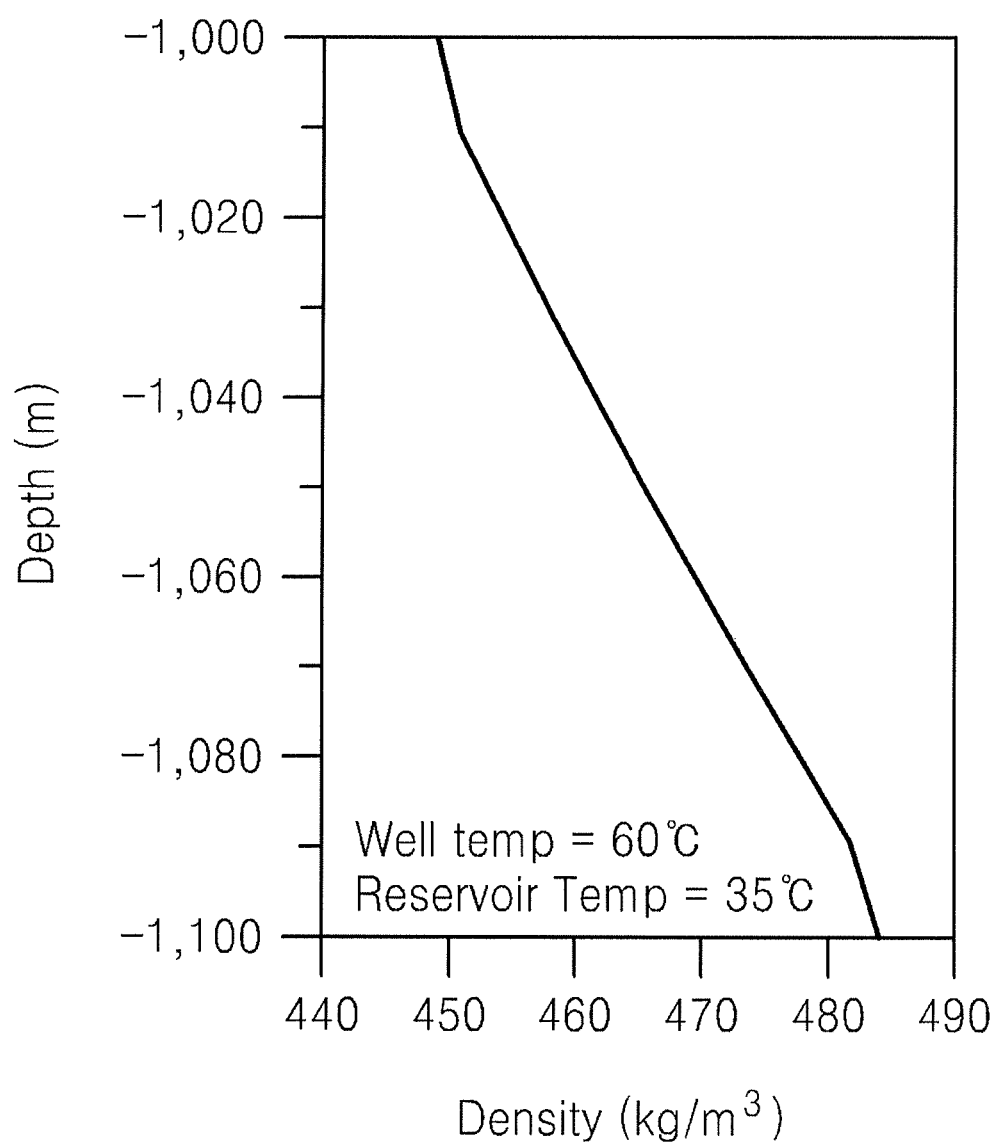

FIGS. 2 to 4 are graphs showing the density variation in the injection well of the target stratum when the temperature of the injection well is set to about 35° C., 45° C., or 60° C. on the assumption that the temperature of the target stratum for the $CO_2$ injection is about 35° C.

As shown in FIGS. 2 to 4, the density represents the range of about 770 kg/m$^3$ to about 783 kg/m$^3$ when the temperature of the injection well is set to about 35° C., and represents the range of about 450 kg/m$^3$ to about 485 kg/m$^3$ when the temperature of the injection well is set to about 60° C., so that the mobility of the fluid is increased.

Figure 5:
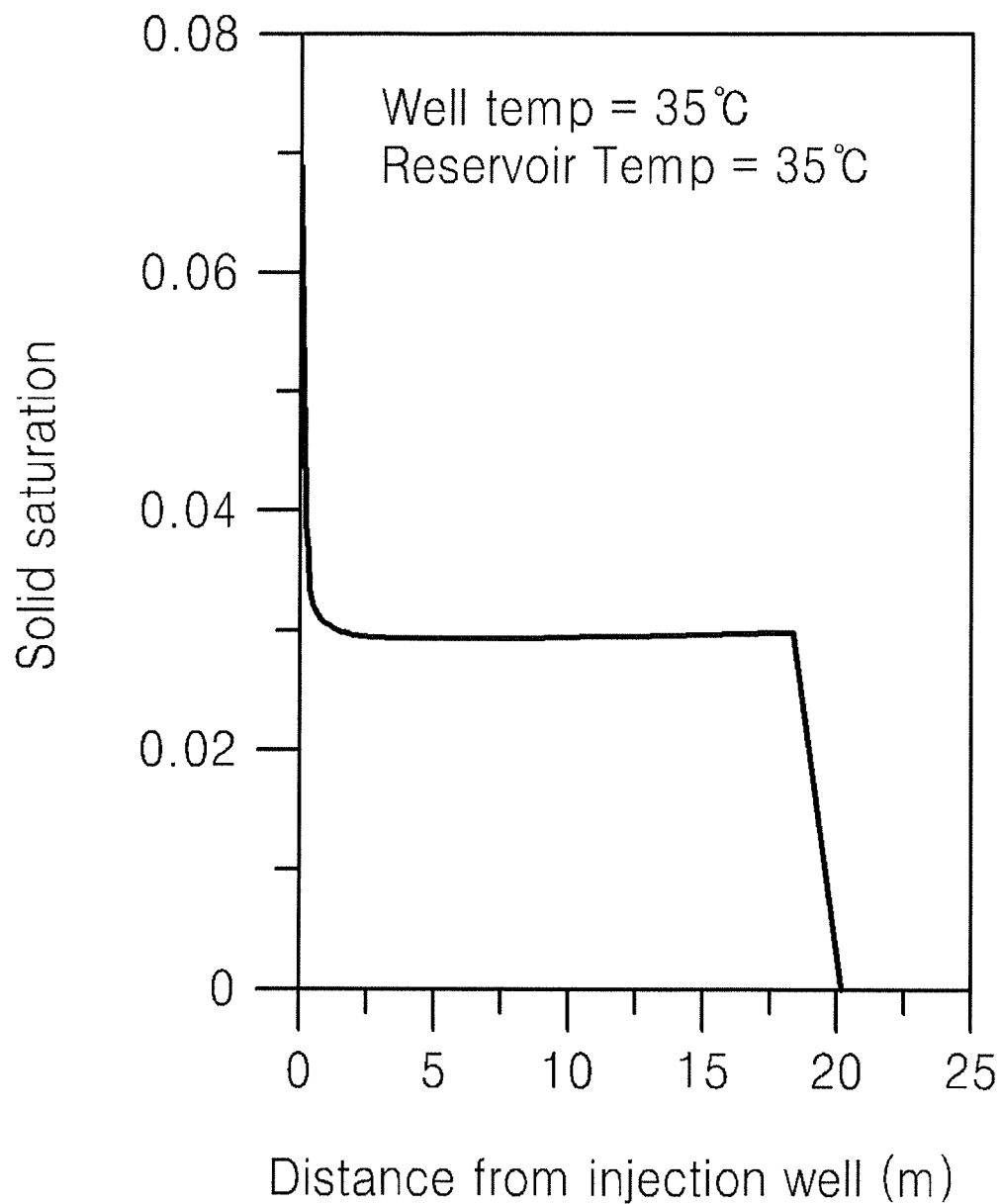
FIGS. 5 to 7 are graphs showing the profile of salt precipitation in a dry-out zone formed around the injection well when the supercritical $CO_2$ is injected according to one embodiment of the present invention.
Figure 6:
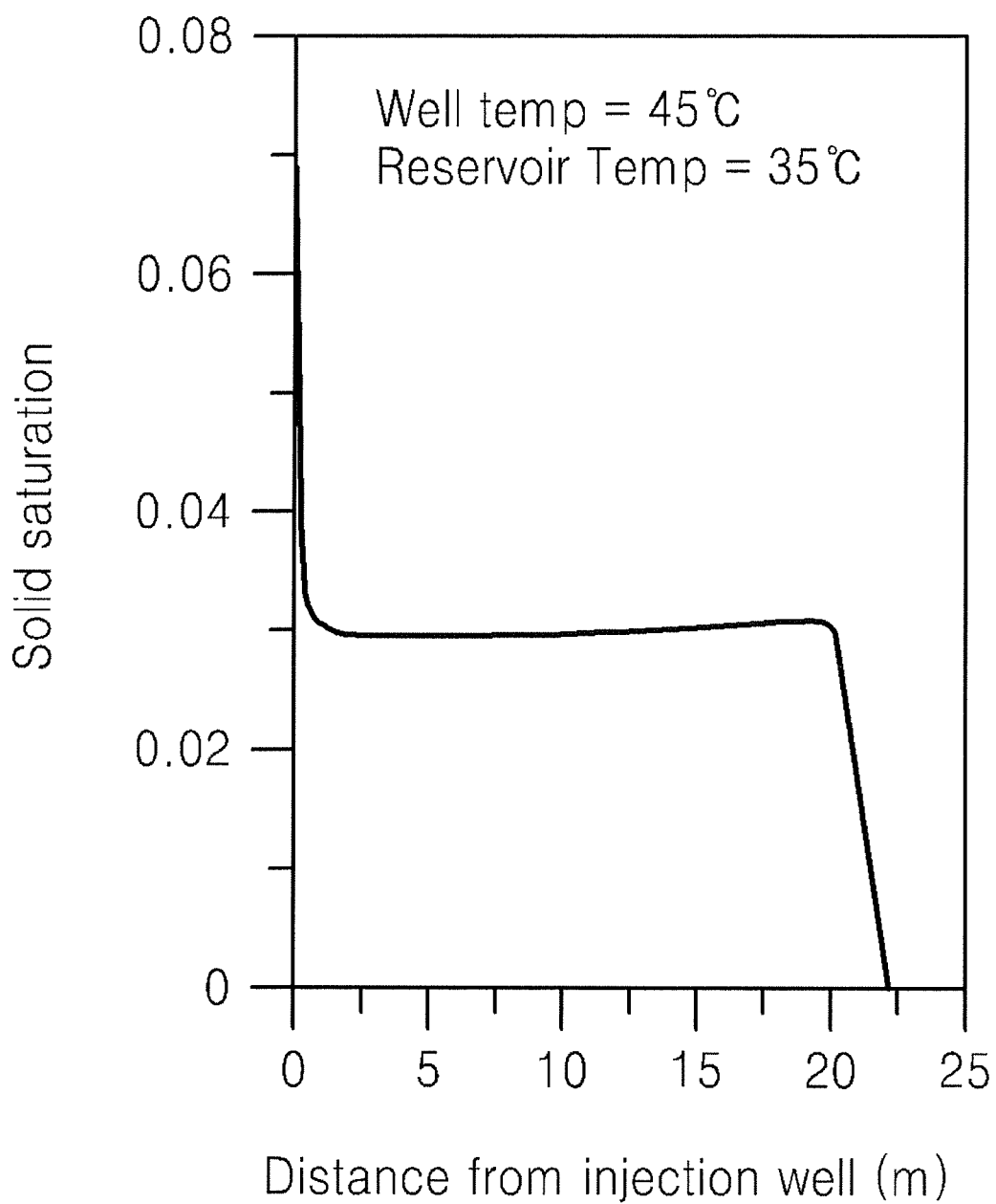
Figure 7:
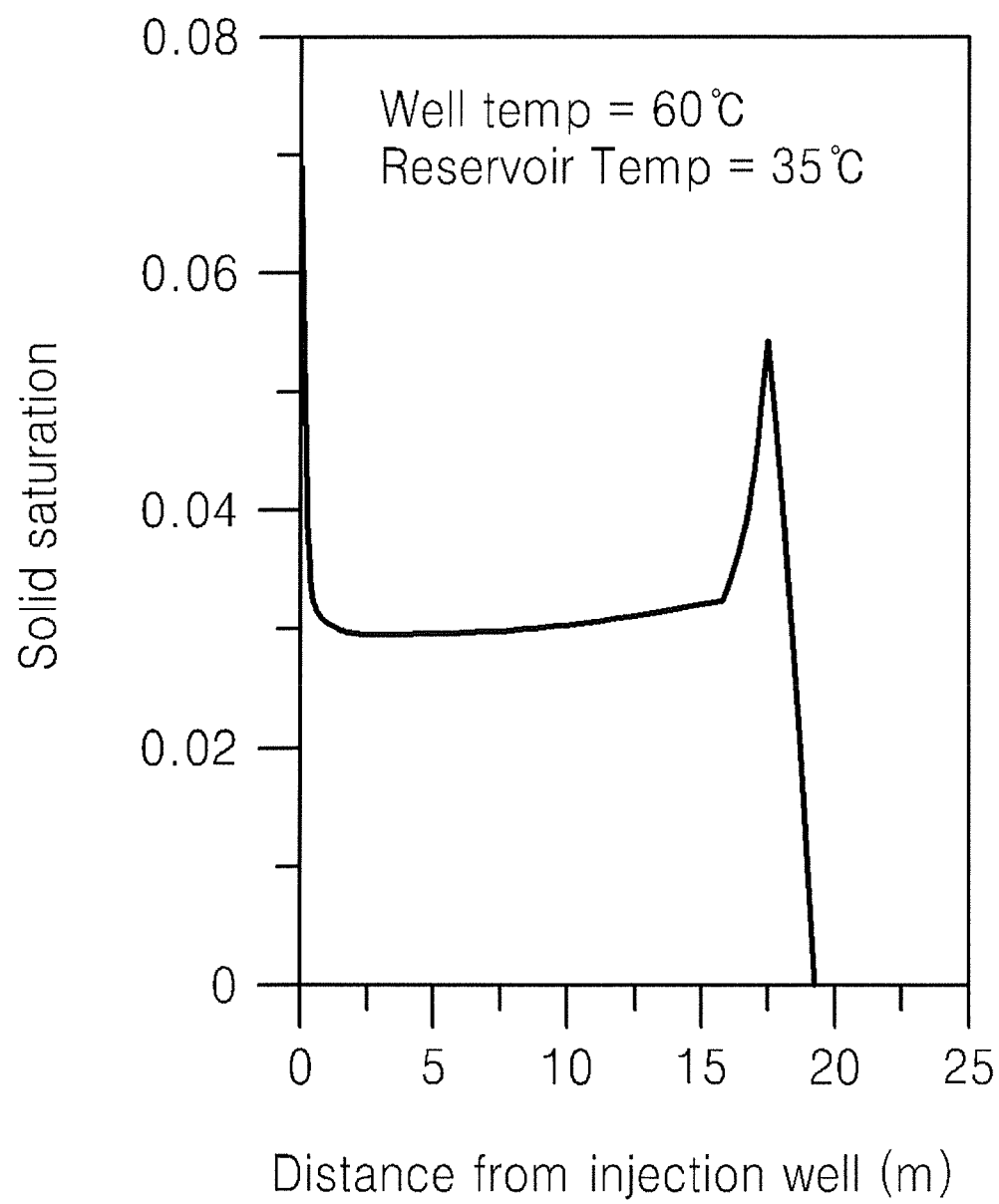

FIGS. 5 to 7 are graphs showing the degree of salt precipitation in a dry-out zone formed around the injection well when the $CO_2$ is injected into the target stratum through the injection well.

As shown in FIGS. 5 to 7, when the temperature of the injection well is set to about 35° C., the dry-out zone ranges to the distance of about 20 m from the injection well, and the salt precipitation occupies about 3% of the air gaps. When the temperature of the injection well is set to about 45° C., the dry-out zone ranges to the distance of about 22 m from the injection well, and the salt precipitation occupies about 3% of the air gaps.

When the temperature of the injection well is set to about 60° C., the dry-out zone ranges from about 19 m from the injection well, and the salt precipitation occupies about 3% of the air gaps at the Buckley-Leverett front. In other words, if the injection temperature of the $CO_2$ is increased, the mobility of the fluid is increased, but the dry-out zone is widened. According to occasions, the degree of the salt precipitation is increased, so that a bad influence may be exerted on the injectivity.

Figure 8:
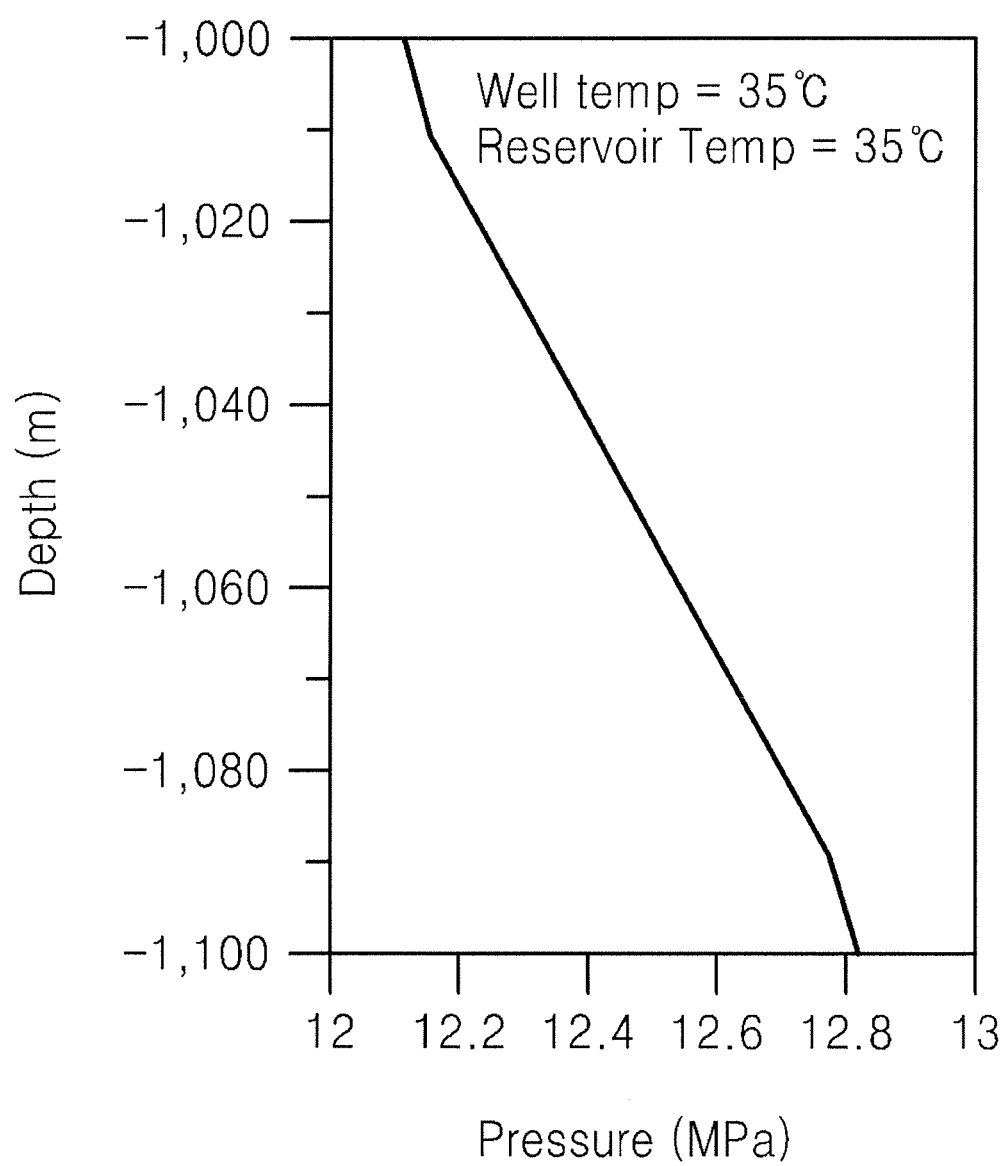
FIGS. 8 to 10 are graphs showing the variation of the $CO_2$ pressure at an injection point in the injection well according to the injection temperatures when the supercritical $CO_2$ is injected according to one embodiment of the present invention.
Figure 9:
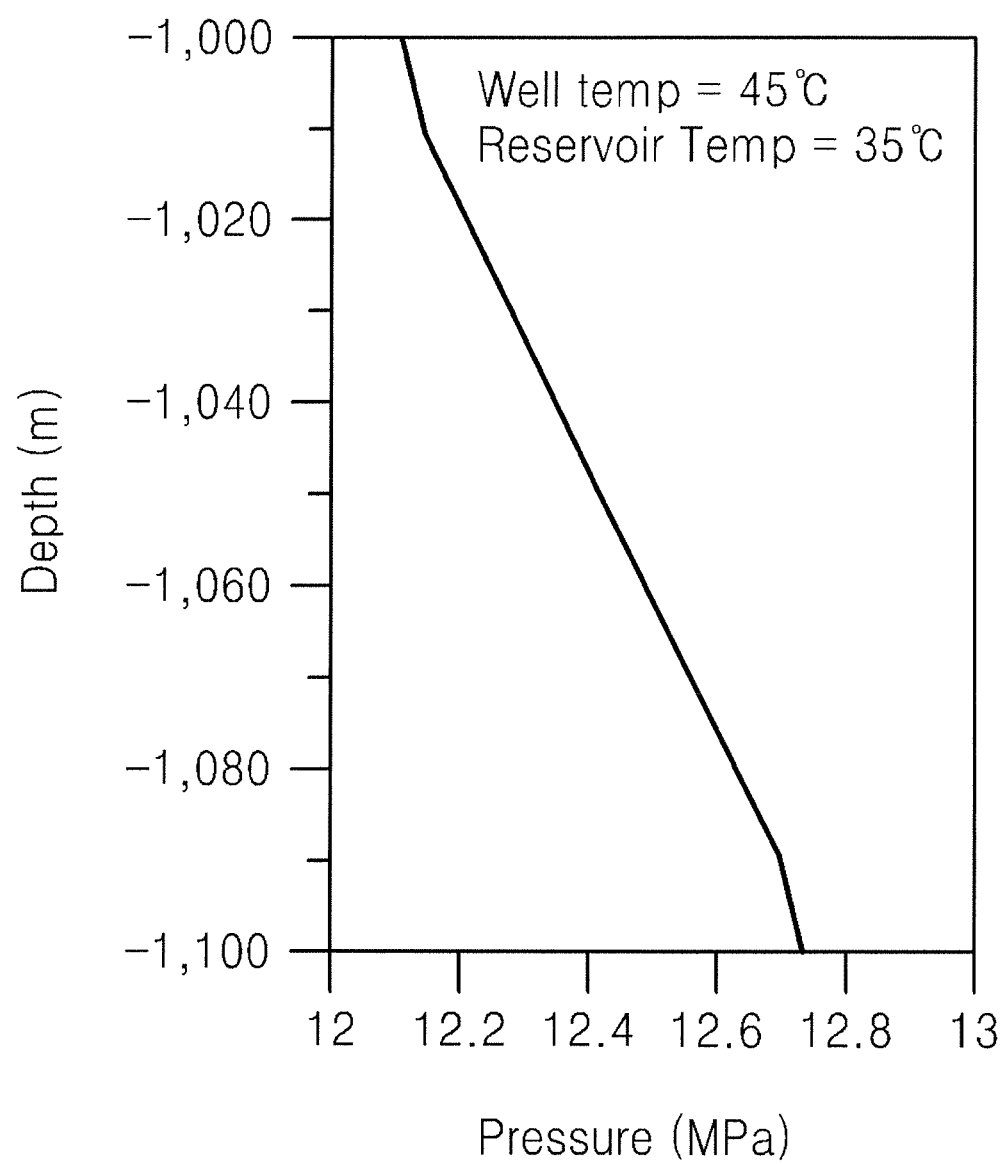

FIGS. 8 to 10 are graphs showing the variation of the injection pressure in the injection section of the $CO_2$ with respect to three cases.

According to the above experimental results, the temperature of the $CO_2$ in the injection well affects the mobility of multi-phase and multi-component fluid under the ground and the physical and chemical reaction in a geologic layer. Accordingly, the system of controlling the fluid temperature is an important factor to increase the injectivity in the geological storage of the $CO_2$.

Although a preferred embodiment of the present invention has been described for illustrative purposes, those skilled in the art will appreciate that various modifications, additions and substitutions are possible, without departing from the scope and spirit of the invention as disclosed in the accompanying claims.

Although the present invention has been described by making reference to the embodiments and accompanying drawings, it should be understood that the present invention is not limited to the embodiments but includes all modifications, equivalents and alternatives. Accordingly, those skilled in the art should understand the spirit and scope of the present invention as defined in the following claims. In addition, those skilled in the art should understand that the equivalents and the modifications belong to the scope of the spirit of the present invention.

What is claimed is:

1. A system of controlling a fluid temperature for improving injectivity of a supercritical carbon dioxide into a stratum, the system comprising:
    a casing part installed in a well, which is formed from a ground surface to a target stratum for injection, in order to inject the supercritical carbon dioxide into the target stratum for injection which is placed under a ground;
    a grouting part formed between the casing part and a counterforted wall of the well;
    a cover covering an upper portion of the casing part;
    an injection tube inserted into the casing part through the cover and receiving the carbon dioxide injected into the injection tube;
    a perforation part serving as a passage allowing the carbon dioxide to flow from the injection tube to the target stratum;
    a packing part formed between the injection tube and an inner portion of the casing part;
    a heat coil part surrounding the injection tube;
    a temperature adjusting unit controlling a temperature of the heat coil part;
    a temperature sensor installed in the injection tube;
    a temperature recording unit storing temperature measurement information obtained from the temperature sensor, wherein the temperature adjusting unit controls the temperature of the heat coil part by using the temperature measurement information stored in the temperature recording unit;
    a pressure sensor installed in the injection tube;
    a pressure recording unit storing pressure measurement information obtained from the pressure sensor; and
    a temperature control system calculating a temperature value representing optimal injectivity by using the temperature measurement information obtained from the temperature recording unit and the pressure measurement information obtained from the pressure recording unit and transmitting the temperature value to the temperature adjusting unit, so that the heat coil part emits heat corresponding to the temperature value,
    wherein the optimal injectivity is represented by maintaining a maximum injection amount of the carbon dioxide at a minimum injection pressure of the carbon dioxide.

2. The system of claim 1, wherein the temperature sensor measures a temperature of the carbon dioxide injected into the target stratum through the injection tube, and the pressure sensor measures a pressure of the carbon dioxide injected into the target stratum through the injection tube.

3. The system of claim 1, wherein the heat coil part includes a thermal conductive material, and surrounds the injection tube from an upper end portion of the injection tube to a lower end portion of the injection tube.

4. The system of claim 1, wherein the heat coil part adjusts a temperature of the carbon dioxide by emitting heat corresponding to a temperature value received from the temperature adjusting unit when the carbon dioxide passes through the injection tube.

5. The system of claim 1, wherein the perforation part includes a plurality of holes bored in the casing part and the grouting part placed in the target stratum for injection.

6. A method of controlling a fluid temperature for improving injectivity of a supercritical carbon dioxide into a stratum, the method comprising:

measuring a temperature of the supercritical carbon dioxide passing through an injection tube in a temperature sensor which is installed in the injection tube into which the supercritical carbon dioxide is injected;

storing temperature measurement information, which is obtained from the temperature sensor, in a temperature recording unit;

controlling a temperature of a heat coil part surrounding the injection tube by using the temperature measurement information, which is stored in the temperature recording unit, in a temperature adjusting unit;

measuring a pressure of the carbon dioxide passing through the injection tube in a pressure sensor installed in the injection tube;

storing pressure measurement information obtained from the pressure sensor in a pressure recording unit;

calculating a temperature value representing optimal injectivity by using the temperature measurement information of the temperature recording unit and the pressure measurement information of the pressure recording unit in a temperature control system; and transmitting the temperature value to the temperature adjusting unit in the temperature control system, so that the heat coil part emits heat corresponding to the temperature value, wherein the optimal injectivity is represented by maintaining a maximum injection amount of the carbon dioxide at a minimum injection pressure of the carbon dioxide.

7. The method of claim 6, wherein the heat coil part includes a thermal conductive material, and surrounds the injection tube from an upper end portion of the injection tube to a lower end portion of the injection tube.

8. The method of claim 6, wherein the heat coil part adjusts the temperature of the carbon dioxide by emitting heat corresponding to a temperature value received from the temperature adjusting unit when the carbon dioxide passes through the injection tube.

9. The method of claim 6, wherein the perforation part includes a plurality of holes bored in the casing part and the grouting part placed in the target stratum for injection.

\* \* \* \* \*